US008473329B1

(12) United States Patent
Manzi et al.

(10) Patent No.: US 8,473,329 B1
(45) Date of Patent: Jun. 25, 2013

(54) METHODS, SYSTEMS, AND ARTICLES OF MANUFACTURE FOR DEVELOPING, ANALYZING, AND MANAGING INITIATIVES FOR A BUSINESS NETWORK

(75) Inventors: James J. Manzi, Washington, DC (US); Anthony Dean Bruce, Chevy Chase, MD (US); Andrew Mark Fedorchek, Centreville, VA (US); Scott Howard Setrakian, San Francisco, CA (US); Mark James D'Agostino, Washington, DC (US); Timothy Patrick O'Reilly, Jr., Arlington, VA (US); David William Kreps, Arlington, VA (US)

(73) Assignee: Applied Predictive Technologies, Inc., Arlington, VA (US)

( * ) Notice: Subject to any disclaimer, the term of this patent is extended or adjusted under 35 U.S.C. 154(b) by 0 days.

(21) Appl. No.: 12/895,960

(22) Filed: Oct. 1, 2010

Related U.S. Application Data

(63) Continuation of application No. 11/052,206, filed on Feb. 8, 2005, now Pat. No. 7,895,072, which is a continuation-in-part of application No. 10/767,191, filed on Jan. 30, 2004, now Pat. No. 8,010,399.

(51) Int. Cl.
*G06Q 10/00* (2012.01)
(52) U.S. Cl.
USPC ....... 705/7.34; 705/7.29; 705/7.31; 705/7.32; 705/7.33
(58) Field of Classification Search
USPC .................. 705/7.11–7.42; 700/95–97; 713/1
See application file for complete search history.

(56) References Cited

U.S. PATENT DOCUMENTS

| 4,972,504 | A | * | 11/1990 | Daniel et al. ..................... 705/10 |
| 5,138,638 | A | * | 8/1992 | Frey .................................. 377/6 |
| 5,227,874 | A | * | 7/1993 | Von Kohorn ..................... 705/10 |
| 5,245,533 | A | * | 9/1993 | Marshall .......................... 705/10 |
| 5,315,093 | A | * | 5/1994 | Stewart ......................... 235/381 |
| 5,406,477 | A | * | 4/1995 | Harhen ............................. 703/6 |
| 5,613,217 | A | | 3/1997 | Hagstrom et al. ......... 455/67.11 |
| 5,692,107 | A | * | 11/1997 | Simoudis et al. ............... 706/12 |
| 5,826,252 | A | * | 10/1998 | Wolters et al. .................... 707/1 |
| 6,078,891 | A | * | 6/2000 | Riordan et al. ................ 705/10 |
| 6,321,206 | B1 | * | 11/2001 | Honarvar .......................... 705/7 |

(Continued)

OTHER PUBLICATIONS

"A process for evaluating retail store efficiency: a restricted DEA approach", Thomas, Rhonda R.; Barr, Richard S.; Cron, William L.; Slocum Jr., John W.; International Journal of Research in Marketing, 15 (1998) 487-503.*

(Continued)

*Primary Examiner* — Alan S Miller
(74) *Attorney, Agent, or Firm* — Eric L. Sophir; Dentons US LLP

(57) ABSTRACT

A system, method, and article of manufacture is disclosed for developing and managing a the test of a business initiative for a business network including business locations. In one aspect of the invention, a method is performed that includes performing a process for developing a business initiative to apply to the business network and performing a process for designing a test for the initiative. Further, the method includes executing the initiative at a set of test sites in accordance with the designed test, each test site corresponds to a selected business location in the business network. Also, performance results of the executed initiative may be analyzed and a rollout plan is created for implementing the initiative at a first set of business locations.

3 Claims, 10 Drawing Sheets

U.S. PATENT DOCUMENTS

| | | | | |
|---|---|---|---|---|
| 6,484,158 | B1* | 11/2002 | Johnson et al. | 705/36 R |
| 6,708,156 | B1* | 3/2004 | Gonten | 705/10 |
| 6,801,818 | B2* | 10/2004 | Kopcha | 700/97 |
| 6,934,748 | B1 | 8/2005 | Louviere et al. | 709/224 |
| 6,966,061 | B1* | 11/2005 | Vance et al. | 718/100 |
| 6,970,830 | B1* | 11/2005 | Samra et al. | 705/10 |
| 7,155,398 | B2* | 12/2006 | Thier | 705/7 |
| 7,155,402 | B1* | 12/2006 | Dvorak | 705/14.41 |
| 7,451,065 | B2 | 11/2008 | Pednault et al. | 703/2 |
| 7,533,036 | B2* | 5/2009 | Bamberg et al. | 705/7.33 |
| 7,546,246 | B1* | 6/2009 | Stamm et al. | 705/7 |
| 7,548,879 | B2* | 6/2009 | Cash et al. | 705/35 |
| 7,599,848 | B2* | 10/2009 | Wefers et al. | 705/7 |
| 7,664,671 | B2* | 2/2010 | Shan | 705/7.11 |
| 7,689,456 | B2 | 3/2010 | Schroeder et al. | 705/10 |
| 7,729,931 | B1* | 6/2010 | Tobin | 705/7.34 |
| 7,949,561 | B2* | 5/2011 | Briggs | 705/14.41 |
| 8,010,404 | B1* | 8/2011 | Wu et al. | 705/7.29 |
| 8,055,547 | B2* | 11/2011 | Kelly et al. | 705/26.1 |
| 8,140,381 | B1* | 3/2012 | Wu et al. | 705/7.35 |
| 8,239,245 | B2* | 8/2012 | Bai et al. | 705/7.37 |
| 8,326,705 | B2* | 12/2012 | Niessen et al. | 705/28 |
| 2001/0032105 | A1* | 10/2001 | Frye et al. | 705/7 |
| 2001/0042003 | A1* | 11/2001 | Tanaka | 705/10 |
| 2002/0069099 | A1* | 6/2002 | Knox et al. | 705/8 |
| 2002/0133250 | A1* | 9/2002 | Kopcha | 700/95 |
| 2002/0169665 | A1* | 11/2002 | Hughes et al. | 705/14 |
| 2003/0018510 | A1* | 1/2003 | Sanches | 705/9 |
| 2003/0023841 | A1* | 1/2003 | Atherton et al. | 713/1 |
| 2003/0028417 | A1* | 2/2003 | Fox | 705/10 |
| 2003/0046125 | A1* | 3/2003 | Flores | 705/7 |
| 2003/0046126 | A1* | 3/2003 | Flores et al. | 705/7 |
| 2003/0050830 | A1* | 3/2003 | Troyer | 705/11 |
| 2003/0069659 | A1* | 4/2003 | Wada et al. | 700/108 |
| 2003/0069782 | A1* | 4/2003 | Chrisman et al. | 705/10 |
| 2003/0110080 | A1* | 6/2003 | Tsutani et al. | 705/14 |
| 2003/0130883 | A1 | 7/2003 | Schroeder et al. | 705/10 |
| 2003/0177055 | A1* | 9/2003 | Zimmerman et al. | 705/10 |
| 2003/0195793 | A1* | 10/2003 | Jain et al. | 705/10 |
| 2003/0212584 | A1* | 11/2003 | Flores | 705/7 |
| 2004/0054511 | A1 | 3/2004 | Turner et al. | 703/6 |
| 2004/0143477 | A1* | 7/2004 | Wolff | 705/9 |
| 2004/0210471 | A1 | 10/2004 | Luby et al. | 705/10 |
| 2004/0243485 | A1* | 12/2004 | Borenstein et al. | 705/27 |
| 2004/0260624 | A1* | 12/2004 | Chan et al. | 705/26 |
| 2005/0039206 | A1 | 2/2005 | Opdycke | 725/35 |
| 2005/0055275 | A1* | 3/2005 | Newman et al. | 705/14 |
| 2005/0075921 | A1 | 4/2005 | Hayes-Roth | 705/10 |
| 2005/0108082 | A1* | 5/2005 | Jenkinson | 705/10 |
| 2005/0200476 | A1* | 9/2005 | Forr et al. | 340/539.13 |
| 2006/0105775 | A1 | 5/2006 | Von Kaenel et al. | 455/456.1 |
| 2006/0116927 | A1* | 6/2006 | Miller et al. | 705/14 |
| 2006/0190318 | A1* | 8/2006 | Downey et al. | 705/10 |
| 2007/0055570 | A1* | 3/2007 | Martin | 705/14 |
| 2008/0243588 | A1* | 10/2008 | Connolly | 705/10 |
| 2012/0084118 | A1* | 4/2012 | Bai et al. | 705/7.31 |

OTHER PUBLICATIONS

Marketing's Contribution to the Implementation of Business Strategy: An Empirical Analysis Author(s): Stanley F. Slater and Eric M. Olson Source: Strategic Management Journal, vol. 22, No. 11 (Nov. 2001), pp. 1055-1067 Published by: John Wiley & Sons.*

What Have We Learned about Generic Competitive Strategy? A Meta-Analysis Author(s): Colin Campbell-Hunt Source: Strategic Management Journal, vol. 21, No. 2 (Feb. 2000), pp. 127-154.*

Idea Management in a Shared Drawing Tool, Iva M. Lu and Marilyn M. Mantei, Proceedings of the Second European Conference on Computer-Supported Coopemtive Work Bannon, L., Robinson, M. & Schmidt, K. (Editors) Sep. 25-27, 1991, Amsterdam, The Netherlands.*

(Eastlack Jr., Joseph O.; Rao, Ambar G. "Advertising Experiments at the Campbell Soup Company", Marketing Science, vol. 8, No. 1 (Winter, 1989), pp. 57-71.*

New Product Models: Practice, Shortcomings and Desired Improvements; Vijay Mahajan, Jerry Wind, Journal of Product Innovation Management, 1992; 9:128-139.*

An Investigation into the New Product Process: Steps, Deficiencies, and Impact; Robert G. Cooper, Elko J. Kleinschmidt,Journal of Product Innovation Management, 1986; 3:71-85.*

Pre-Test-Market Models: Validation and Managerial Implications Glen L. Urban; Gerald M. Katz Journal of Marketing Research, vol. 20, No. 3. (Aug. 1983), pp. 221-234.*

The New Product Development Process for Commercial Financial Services; Scott J. Edgett, Industrial Marketing Management 25, 507-515 (1996).*

Cluster Analysis in Test Market Selection Author(s): Paul E. Green, Ronald E. Frank, Patrick J. Robinson Source: Management Science, vol. 13, No. 8, Series B, Managerial (Apr. 1967), pp. B387-B400.*

The short-term effect of store-level promotions on store choice, and the moderating role of individual variables; Pierre Volle, Journal of Business Research 53 (2001) 63-73.*

An Empirical Analysis of Strategy Types Author(s): Craig Galbraith and Dan Schendel Source: Strategic Management Journal, vol. 4, No. 2 (Apr.-Jun. 1983), pp. 153-173.*

An Application of Clustering for Strategic Group Analysis Author(s): Kathryn Rudie Harrigan Source: Strategic Management Journal, vol. 6, No. 1 (Jan.-Mar. 1985), pp. 55-73.* www.predictivetechnologies.com/(caputured Feb. 3, 2001 and Feb. 18, 2003).*

"Applied Predictive Technologies Launches Adaptive Marketing Suite" EnterpriseAppsToday.com, Dec. 21, 2000.*

"Applied Predictive Technologies Makes Consulting Automatic" Washington Post, Aug. 20, 2001.*

"Retail location analysis, step three: Assessing relative performance"; Grant Ian Thrall; Juan C del Valle; Gordon HinzmannGeo Info Systems; Apr. 1998; 8, 4; ProQuest Computing p. 38.*

"Applying the seven-step site selection methodology to Red Lobster Restaurants"; Grant Ian Thrall; Juan C del Valle; Gordon Hinzmann; Geo Info Systems; Feb. 1998; 8,2; ProQuest Computing p. 40.*

"Finding the potential 'hotspots'"; Guy P Abramo; NPN, National Petroleum News; Mar. 1997; 89, 3; ABI/INFORM Global p. 24.*

"Site Selection vs. Site Evaluation: Techniques for Locating"; Meyer, Terry G. ; Real Estate Issues; Spring/Summer 1988; 13, 1; ABI/INFORM Global p. 25.*

Slater, Stanley F. and Olson, Eric M., "Marketing's Contribution to the Implementation of Business Strategy: An Empirical Analysis," *Strategic Management Journal*, vol. 22, No. 11, pp. 1055-1067 (Published by John Wiley & Sons), Nov. 2001.

Lu, Iva M. and Mantei, Marilyn M., "Idea Management in a Shared Drawing Tool," *Proceedings of the Second European Conference on Computer-Supported Cooperative Work,* Bannon, L., Robinson, M., and Schmidt, K. (Editors), Sep. 25-27, 1991, Amsterdam, The Netherlands.

Voile, Pierre, "The Short-Term Effect of Store-Level Promotions on Store Choice, and the Moderating Role of Individual Variables," *Journal of Business Research,* 53 (2001), 63-73.

Campbell-Hunt, Colin, "What Have We Learned About Generic Competitive Strategy? A Meta-Analysis," *Strategic Management Journal*, vol. 21, No. 2, pp. 127-154, Feb. 2000.

Thomas, Rhonda R., Barr, Richard S., Cron, William L., Slocum, Jr., John W., "A Process for Evaluating Retail Store Efficiency: A Restricted DEA Approach," *International Journal of Research in Marketing,* 15 (1998), 487-503.

Edgett, Scott J., "The New Product Development Process for Commercial Financial Services," *Industrial Marketing Management,* 25, 507-515 (1996).

Mahajan, Vijay, Wind, Jerry, "New Product Models: Practice, Shortcomings and Desired Improvements," *Journal of Product Innovation Management,* 9:128-139, 1992.

Eastlack, Jr., Joseph O., Rao, Ambar G., "Advertising Experiments at the Campbell Soup Company," *Marketing Science,* vol. 8, No. 1 pp. 57-71, Winter, 1989.

Cooper, Robert G., Kleinschmidt, Elko J., "An Investigation into the New Product Process: Steps, Deficiencies, and Impact," *Journal of Product Innovation Management,* 3:71-85, 1986.

Harrigan, Kathryn Rudie, "An Application of Clustering for Strategic Group Analysis," *Strategic Management Journal,* vol. 6, No. 1, pp. 55-73, Jan.-Mar. 1095.

Urban, Glen L. and Katz, Gerald M., "Pre-Test-Market Models: Validation and Managerial Implications," *Journal of Marketing Research,* vol. 20, No. 3, pp. 221-234, Aug. 1983.

Galbraith, Craig and Schendel, Dan, "An Empirical Analysis of Strategy Types," *Strategic Management Journal,* vol. 4, No. 2, pp. 153-173, Apr.-Jun. 1093.

Green, Paul E., Frank, Ronald E., and Robinson, Patrick J., "Cluster Analysis in Test Market Selection," *Management Science,* vol. 13, No. 8, Series B., Managerial, pp. B387-B400, Apr. 1967.

Avery, Jill, et al., "Adding Bricks to Clicks: The Contingencies Driving Cannibalization and Complementarity in Multichannel Retailing," Feb. 2009, Harvard Business School, Jan. 7, 2009, http://papers.ssrn.com/sol3/papers.cfm?abstract_id=995647.

* cited by examiner

CONFIDENCE MATRIX

USE THE SETTINGS BELOW TO ANALYZE HOW SPECIFIC NUMBERS OF TEST AND CONTROL SITES PRODUCE DIFFERENT LEVELS OF STATISTICAL CONFIDENCE IN AN ANALYSIS OF TEST PERFORMANCE RELATIVE TO CONTROL (FOR A GIVEN TEST VS. CONTROL PERFORMANCE DIFFERENCE).

METRIC: ? SALES - GM - $ - W - FINSEG
CATEGORY: TOTAL EDIT CATEGORY

TEST PERIOD:
START: JAN 1 2004
END: JAN 31 2004

CONTROL PERIOD:
START: JAN 1 2003
END: JAN 31 2003

GROUP FOR TEST SELECTION: ? FIN - SALES - COMP DATA - FY02
GROUP FOR CONTROL SELECTION: ? FIN - SALES - COMP DATA - FY02
OF SITES IN CONTROL: 100
% LIFT (DECIMAL FORM): 0.03
SIZE OF % LIFT INTERVAL: 0.01
SITES IN TEST: 25
SIZE OF # TEST
SITES INTERVAL: 5

| TEST SIZE | 1.00% LIFT | 2.00% LIFT | 3.00% LIFT | 4.00% LIFT | 5.00% LIFT |
|---|---|---|---|---|---|
| 15 | 59.58% | 67.16% | 75.56% | 81.92% | 87.12% |
| 20 | 59.70% | 69.39% | 78.32% | 85.19% | 90.10% |
| 25 | 60.78% | 71.56% | 80.49% | 87.17% | 91.87% |
| 30 | 61.58% | 73.15% | 82.25% | 88.99% | 93.39% |
| 35 | 62.27% | 74.54% | 83.78% | 90.33% | 94.72% |

<< CLOSE WINDOW OR UPDATE MATRIX

*FIG. 4B*

FIG. 5B ns networkUS 8,473,329 B1

METHODS, SYSTEMS, AND ARTICLES OF MANUFACTURE FOR DEVELOPING, ANALYZING, AND MANAGING INITIATIVES FOR A BUSINESS NETWORK

RELATED APPLICATION

This application is a continuation of U.S. patent application Ser. No. 11/052,206, entitled "Methods, Systems, and Articles of Manufacture for Analyzing Initiatives for a Business Network," and filed Feb. 8, 2005 now U.S. Pat. No. 7,895,072, which is a continuation-in-part of U.S. patent application Ser. No. 10/767,191, entitled "Methods, Systems, and Articles of Manufacture for Analyzing Initiatives for a Business Network," and filed Jan. 30, 2004 now U.S. Pat. No. 8,010,399, all of which are hereby incorporated by reference in their entirety.

FIELD OF THE INVENTION

This invention relates to business initiative analysis systems, and more particularly, to methods, systems, and articles of manufacture for developing, analyzing, and managing initiatives for implementation at selected business locations in a business network.

BACKGROUND OF THE INVENTION

For as long as retailers have been selling products and services, they have been seeking ways to increase profits. Accordingly, many retailers create new initiatives that they believe will have a positive impact on profits. These initiatives usually cover various aspects of business operations that drive profits. For example, retailers may change product prices, move products to different locations of a sales floor, change the amount of space allocated to each product, test new products, add or reduce sales staff, introduce new concepts (e.g., in-store kiosks), remodel older stores, and test new marketing campaigns. Retailers may test these new initiatives in selected test locations (i.e., certain stores) and subsequently determine whether to introduce the initiatives to remaining business locations based on the success of the initiatives at the selected test locations. Historically, retailer managers have used business instinct and/or anecdotal evidence to assess the success of the initiatives in order to make a decision whether to implement the initiatives at the rest of its business locations.

In recent years, however, some retailers have become more structured and analytical in their set up and analysis of tests. These retailers collect performance metrics, such as sales and gross profit data from the test locations and analyze the data using conventional software products, such as spreadsheet or statistical software packages. Retailers may measure the change in the performance metrics at the locations that introduced the new initiatives relative to a change in the same metrics at a control group of locations that did not implement the initiatives. In doing so, the retailers attempt to identify the impact of the initiatives on the performance metrics in order to determine whether they provide a positive return on investment. Accordingly, these retailers can make an informed decision whether to extend the concept to remaining locations in a business network.

As retailers improve their approach in analyzing initiatives, they have increased the frequency and scope of the initiatives under test. Often, several functional teams associated with a retailer may independently design, execute, and analyze initiatives under consideration for implementation at the retailer's business locations. For example, a marketing team may test a new advertisement for a product in certain markets, while an operations team tests a new training initiative. At the same time, a merchandising team may be modifying product displays and a store development team may be remodeling the layout of the retailer's locations. Accordingly, it is becoming increasingly difficult to coordinate the analysis of initiatives among the several functional teams that may implement, or is implementing, one or more initiatives. The consequence is that teams are unaware that tests are run in the same location at the same time. This simultaneous testing affects the outcome regarding the actual impact a particular initiative may have at given location. For instance, an operations team may associate a significant sales increase in a particular test market to a recently executed training initiative without realizing that a marketing team had run additional advertising in the same market. Such concurrent testing may cause the operations team to over-estimate the impact of their testing training program and make inefficient decisions regarding whether to extend the training program to other markets.

Further, functional teams may find it increasingly difficult to communicate and coordinate with the retail locations actually implementing an initiative. For example, suppose that an operations team desires to test the impact of additional labor in a set of retail locations during a particular holiday season. Accordingly, the operations team may allocate a larger budget for the acquisition of additional labor for particular locations. The managers of these locations, however, still need to actually spend the allotted budget on additional labor. Any deviation from this purpose affects the outcome of the analysis of the initiative. Without tools to enable the execution of an initiative, functional teams may find it difficult to ensure that locations are aware of an initiative and are actually executing the initiative as proposed by the team.

SUMMARY OF THE INVENTION

It is therefore desirable to have a centralized system that allows a retailer to coordinate the development, planning, execution, and analysis of the initiatives across different personnel, teams (e.g., functional, operations, etc.), and business locations to ensure initiatives are not duplicated and are properly executed. Accordingly, there is a need for a system that manages the designing, running, and analyzing of initiatives in a business network.

In one aspect of the invention, a method is provided for developing and managing a business initiative in a business network including business locations. The method may be performed in connection with a set of instructions stored on a computer-readable medium and executed by a processor and includes performing a process for developing a business initiative to apply to the business network and performing a process for designing a test for the initiative. Further, the method includes process support for executing the initiative at a set of test sites in accordance with the designed test, each test site corresponds to a selected business location in the business network. Also, performance results of the executed initiative may be analyzed and a rollout plan is created for implementing the initiative at a set of business locations.

In another aspect of the invention, a method is provided for designing a test for a business initiative that is to be executed in a business network including business locations. The method may be performed in connection with a set of instructions stored on a computer-readable medium and executed by a processor, and comprises selecting a set of test sites that correspond to business locations that are to execute the initiative during the designed test. Further, the method may include selecting a set of control sites that correspond to business locations that do not execute the initiative during the designed test. These control sites are used to set a baseline against which the change in performance at the test sites will be measured. Additionally, the method may include determining the strength of the relationship between the performance of the control sites and the performance of the test sites during a selected period of time before an execution date of the initiative at the test sites.

In yet another aspect of the invention, a method is provided for managing the execution of a business initiative in a business network having business locations including a set of test sites corresponding to business locations that execute the initiative. The method may be performed in connection with a set of instructions stored on a computer-readable medium and executed by a processor, and includes providing a database including information reflecting a progress of the execution of the initiative at the set of test sites and information reflecting a status of other initiatives being executed in the business network. The method may also include updating the database based on information received from anyone of the test sites reflecting a status of the initiative at the respective one test site. Also, the method includes updating the database based on information received from any of the business locations reflecting the status of the other initiatives being executed in the business network.

An additional aspect of the invention includes a system for developing and managing a business initiative in a business network including business locations. The system comprises a computer system that is configured to perform processes for managing and developing the initiative. In one aspect, the processes may include a process for developing a business initiative to apply to the business network and a process for designing a test for the initiative. Also, the computer system may perform a process for managing the execution of the initiative at a set of test sites in accordance with the designed test; wherein each test site corresponds to a selected business location in the business network. Further, the computer system may perform a process for analyzing performance results of the executed initiative and a process for creating a rollout plan for implementing the initiative at a set of business locations.

Additional aspects of the invention will be set forth in part in the description which follows, and in part will be obvious from the description, or may be learned by practice of methods, systems, and articles of manufacture consistent with features of the present invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

FIG. 4B shows a screen shot of an exemplary site selection Web page, consistent with certain aspects of the present invention;

FIG. 5B shows a screen shot of an exemplary initiative execution checklist Web page, consistent with certain aspects of the present invention.

DETAILED DESCRIPTION

Figure 1:
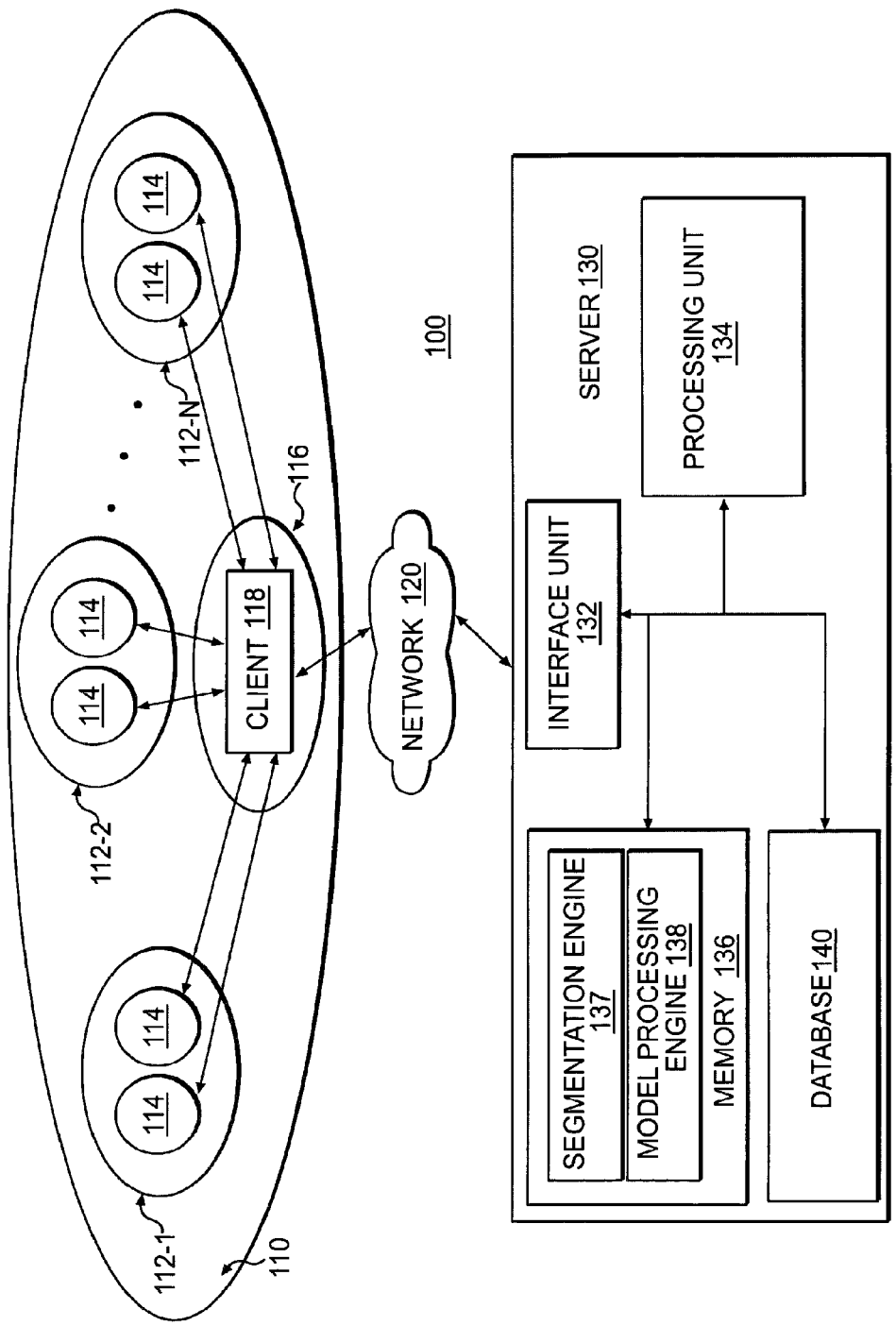
FIG. 1 illustrates an exemplary system environment in which methods, systems, and articles of manufacture, consistent with features and principles of the present invention may be implemented.

Methods, systems and articles of manufacture consistent with certain aspects of the present invention manage the development, execution, analysis, and implementation of initiatives for a business network.

In accordance with one aspect of the invention, a system performs one or more processes for developing, testing, analyzing, and monitoring a business initiative for a business network. The network may include business locations, some of which may be designated as test sites that implement the business initiative for a predetermined test period and some of which may be designated as control sites that do not implement the initiative. Each of the sites have an associated set of attributes reflecting various characteristics corresponding to the respective site, such as geographical location, size of business location, number of employees, etc. In one aspect of the invention, the system performs processes that assists a business in selecting an initiative. For example, the system may provide access to data associated with other initiatives that may have been developed, tested, executed, analyzed, and/or implemented within (or outside) the business network. Further, the system may perform processes that prioritize potential initiatives for selection and provides notifications to the business locations of a selected initiative.

In accordance with another aspect of the invention, the system performs processes that design a test for a selected initiative. In this aspect, the system may determine the number and types of test sites and/or control sites that should be associated with the selected initiative under test. The system may perform a process that determines how many test and control sites are needed in order to have statistical confidence in the results when analyzing the test. The system also provides information reflecting the initiatives being tested in the business network. The system may provide a graphical view of the business locations of the business network in relation to the initiatives assigned, executing, and/or implemented by these locations. This allows the user to know if other initiatives are scheduled for testing or implementation at the test and/or control stores at the same time.

In accordance with another aspect of the invention, the system may manage the execution of an initiative under test.

The system may provide a checklist to business locations designated as test sites that includes tasks that are to be performed while executing an initiative under test. The system also provides notifications to the test sites, and receives corresponding feedback from these sites, reflecting events corresponding to the tested initiative. Based on the feedback, the system monitors execution of the initiative at the test sites and updates information reflecting the performance of the initiative at each of the sites.

Also, the system collects performance values for each of the test and control group sites reflecting a level of performance of each site during the test period for the initiative. The system then calculates the change in performance in the test sites during the test period, relative to the change in performance in the control group sites over the same time period. The system may segment the performance values for each test site attribute to identify those attributes that have a greater impact on the performance values of the test sites than other attributes. Further, the system configures a model for predicting the performance values of the test sites using the identified attributes and determines whether the model accurately predicts these performance values. If so, the system applies the model to all non-tested sites (i.e., all business locations in the business network) to predict the performance values of each site. Based on the predicted performance values, a user or software process associated with the business network may select one or more of those sites to implement the business initiative. Additionally, once models have been created that estimate the impact of initiatives if each were implemented at each business location, the system performs processes that model the impact of comparable initiatives at each location and identifies the best initiative for rollout at each location based on the performance results of the models.

Additionally, the system manages the rollout of a tested initiative by providing information to the business locations that reflects schedules and tasks for implementing the initiative. Users at the business locations may update the information based on their respective location. These updates are reflected in a data structure that is accessible by each of the business locations and a business management unit to coordinate the rollout at the business locations. For instance, a user associated with a given business location may adjust the rollout date of a tested initiative for their business location in the event a proposed rollout date may disrupt the current performance of their location.

Reference will now be made in detail to the exemplary aspects of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instructions or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

I. SYSTEM OVERVIEW

FIG. 1 illustrates an exemplary system environment 100 in which certain aspects related to the present invention may be implemented. As shown, system environment 100 may include a business network 110, network 120, and a server 130.

Business network 110 represents a network of businesses that provide similar products and/or services to customers. The businesses may be geographically dispersed. Business network 110 may include one or more business regions 112-1 to 112-N that represent different geographical locations, such as cities, counties, states, country regions, virtual boundaries having a predetermined bounded distance (e.g., 100 mile radius), and any other type of defined region within a particular location. Each region 112-1 to 112-N may include one or more business locations 114 that represent retailers that sell products and/or services associated with business network 110. For example, business network 110 may represent a grocery store chain that includes a plurality of stores geographically dispersed among a state of the United States. Each region 112-1 to 112-N may represent locations that include grocery stores in the chain (e.g., business locations 114) that are within a predetermined distance of one another (e.g., 100 mile radius).

Also included in business network 110 is business management unit 116, which represents a business entity that manages business network 110. For example, business management unit 116 may be an organization headquarters or a particular division for business network 110, such as a marketing division, an operations division, etc. Unit 116 may include one or more clients 118 that are operated by one or more users associated with business network 110 that perform various management and/or marketing duties for business network 110. Following the above example, business management unit 116 may be a marketing division of the exemplary grocery store chain that determines which products and/or services each retailer location (e.g., location 114) should provide.

In one aspect of the invention, client 118 may be one or more computer systems such as a desktop computer, workstation, laptop, personal digital assistant or any other similar computing system operated by a user. Client 118 may include a processor, associated memory, and other elements and functionalities available in computer systems (all not shown). These elements may include input/output devices, such as a keyboard, mouse, and display, although these input means may take other forms. Also, client 118 may include a network interface for communicating with external resources, such as network 120 and server 130. Further, client 118 may execute browser software that enables a user to request, receive, and render information from network 120.

Although FIG. 1 shows business network 110 including a single business management unit 116 (and accompanying client 118), each business location 114 may include a client 118 that is capable of accessing network 120 and server 130 to access and perform processes consistent with certain aspects related to the present invention. Further, although business network 110 is shown including a plurality of regions 112-1 to 112-N, network 110 may include business locations 114 that are all included within a single region. Also, business locations 114 and client 118 may all be interconnected by a communication network (not shown).

Network 120 may be a shared, public, or private network and encompasses a wide area or local area. Network 120 may be implemented through any suitable combination of wired and/or wireless communication networks. For example, network 120 may be implemented through a Wide Area Network ("WAN"), Local Area Network ("LAN"), an intranet and/or the Internet. Further, network 120 may represent multiple networks, such as a wireless carrier network connected to the Internet. As such, through the communication network interconnecting business locations 114 and client 118, business locations 114 may also be connected to server 130 via network 120.

Server 130 may be a computer system such as a desktop computer, workstation, or any other similar server side computing system that performs one or more server-side processes. In one aspect of the invention, server 130 may include, among other things, interface unit 132, processing unit, 134, memory 136, and database 140. Although server 130 is shown including elements 132-140, it may include additional computing elements, such as an input/output device (e.g., display, mouse, keyboard) that enables a user to access the data and software in server 130. In addition, server 130 may be a group of servers.

Interface unit 132 may be one or more hardware and/or software components that are configured to receive and send information from/to network 120. Interface unit 132 may include, or leverage, different types of software to control access to information maintained by server 130. For example, interface unit 132 may execute firewall software that controls access to information and processes provided by server 130 using one or more security protocols (e.g., password processing, encryption technologies, etc. The above listed functionalities are not intended to be limiting and interface unit 132 may perform other types of interface processes to facilitate the exchange of information between server 130 and network 120.

Processing unit 134 may be one or more processing devices that execute software processes stored in one or more memory devices, such as memory 136. Further, processing unit 134 may execute software processes stored internally, such as internal flash memory configured within processing unit 134.

Memory 136 may be one or more memory devices that store data and software programs that, when executed by processing unit 134, perform processes consistent with certain aspects related to the present invention. These programs may include segmentation engine 137, and model processing engine 138. Further, memory 136 may include server-side software applications that enable server 130 to create and provide content including information produced by other programs executed by processing unit 134, such as web server software. Alternatively, server 130 may leverage web server software that is located in another memory device (not shown) internal or external to server 130. The above software programs and functionalities are not intended to be limiting and memory 136 may be configured to store additional or fewer types of data and/or software programs that perform other processes consistent with server-side computing systems.

Database 140 may be one or more memory devices that store data and/or executable software that is used by server 130 to perform processes consistent with certain aspects related to the present invention. For example, database 140 may include one or more data structures (e.g., tables, maps, arrays, directories, etc.) that include data that is used by one or more of the software programs stored in memory 136 and executed by processing unit 134. Although server 130 shows database 140 and memory 136 as separate elements, the information and software stored in these elements may be combined in a single memory device. Also, memory 136 and/or database 140 may be located external to server 130 and accessible through network 120 or a dedicated back-end communication path, such as a Local Area Network (LAN).

Furthermore, the processes and functionalities associated with server 130 described herein are not limited to execution by server 130. In other aspects of the invention, client 118 may implement similar hardware and/or software components to perform processes executed by server 130 described below.

II. INITIATIVE DEVELOPMENT AND ANALYSIS PROCESS

Figure 2:
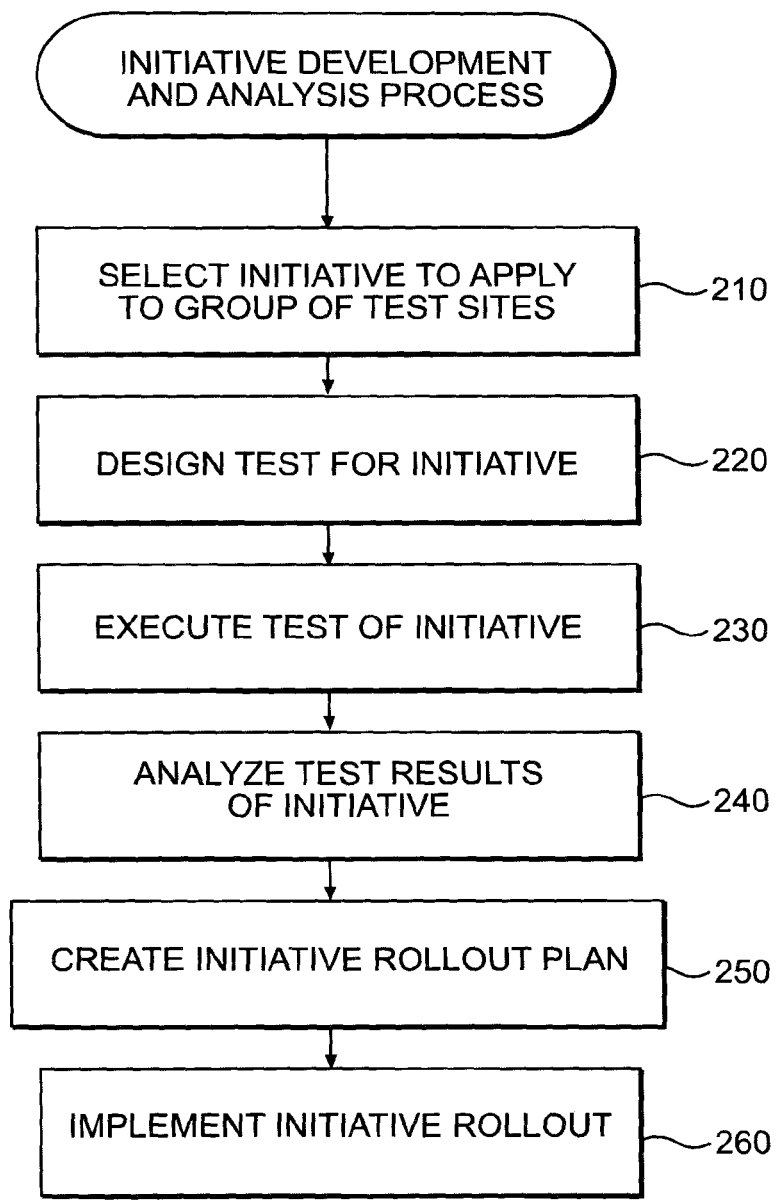
FIG. 2 illustrates a flowchart of an exemplary initiative development and analysis process, consistent with certain aspects of the present invention.

Methods, systems, and articles of manufacturer consistent with aspects of the present invention enable one or more users of client 118 to access functionalities offered by server 130 to develop one or more initiatives, design tests for these initiatives, execute the tests, analyze the results of the tests, and determine rollout plans for implementing the initiative in business network 110. For example, a user in business management unit 116 may execute browser software in client 118 to implement processes executed by server 130 to develop and analyze an initiative. FIG. 2 shows an exemplary initiative development and analysis process that may be performed by methods, systems, and/or articles of manufacture consistent with aspects of the present invention.

Initially, a user or users at business management unit 116 may select an initiative that is to be applied to a group of test sites reflecting a set of business locations 114 (e.g., thirty stores) included in business network 110 (Step 210). The proposed initiative may be a change in store layouts, offering different products and/or services, different marketing campaigns (e.g., advertising, sales promotions, etc.), and any other type of idea that may be implemented at the selected test sites.

The user of business management unit 116 may then design a test for the selected initiative by selecting where and when the initiative is to be tested (Step 220). The user of business management unit 116 may then direct the selected test sites to execute the test of the proposed initiative (Step 230). The initiative may be implemented for a predetermined amount of time (e.g., three months, six months, etc.), which is also known as a test period. Alternatively, the initiatives may be implemented at the test sites indefinitely. During the test period, business management unit 116 may collect feedback results from each test site based on one or more performance metrics selected by unit 116. For example, business management unit 116 may request sales information, foot traffic (Le., number of persons entering a business location), etc. from each test site during the test period and may request additional performance data for each test site for a period before the test period. Additionally, business management unit 116 collects result data for control sites that are identified during the design of the initiative test.

Once the appropriate feedback results are collected, a user at business management unit 116 may implement client 118 and/or server 130 to analyze the test results of the executed initiative (Step 240). The initiative analysis process provides information regarding the effectiveness of the initiative at the test sites. Further, the initiative process provides information regarding a proposed effectiveness of the initiative if implemented in other non-tested business locations in business network 110 (i.e., retailer locations that did not implement the initiative). These other business locations may be referred to as non-test group sites. In one aspect of the invention, the initiative analysis process includes the exchange of information between client 118 (under the operation of a user) and server 130. For example, a user operating client 118 may implement browser software to access one or more web sites that are provided or leveraged by server 130 to analyze the test results of the initiative. Accordingly, server 130 may provide content to client 118 that includes queries, data, and analysis information associated with the initiative analysis process.

In certain aspects, to assist in analyzing the initiative test results, client 118 may download information to server 130 associated with the results of the test initiatives at the test sites. Further, server 130 may receive, or retrieve, attributes associated with each business location 114 from client 118. An attribute may be characteristics associated with a business location, such as store size, locations, sale data, types of products and/or service offered, location and distances of competing merchant sites, age of the business location, amount of a lease (if any), weather during the test period, staff information, etc. Alternatively, or in addition to the information provided by client 118, server 130 may execute software that determines, collects, and/or retrieves attribute information associated with business network 110, regions 112-1 to 112-N (e.g., population and demographic data, etc.), and business locations 114. The attribute information may be stored in database 140 for subsequent use by server 130 and/or client 118.

A user, such as a manager at business management unit 116, or software processes executed by a processor, may analyze the information provided by server 130 and create an initiative rollout plan for implementing the initiative at one or more applicable business locations 114 (Step 250). These may include some or all of business locations 114. Once the rollout plan is created, the initiative may be rolled out to the applicable business locations 114 (Step 260). Accordingly, business management unit 116 and/or server 130, determines and implements one or more strategies associated with the tested initiative in a selected number of business locations 114, and/or groups of locations, such as regions 112-1 to 112-N.

III. SELECTING AN INITIATIVE TO APPLY TO A GROUP OF TEST SITES

Figure 3:
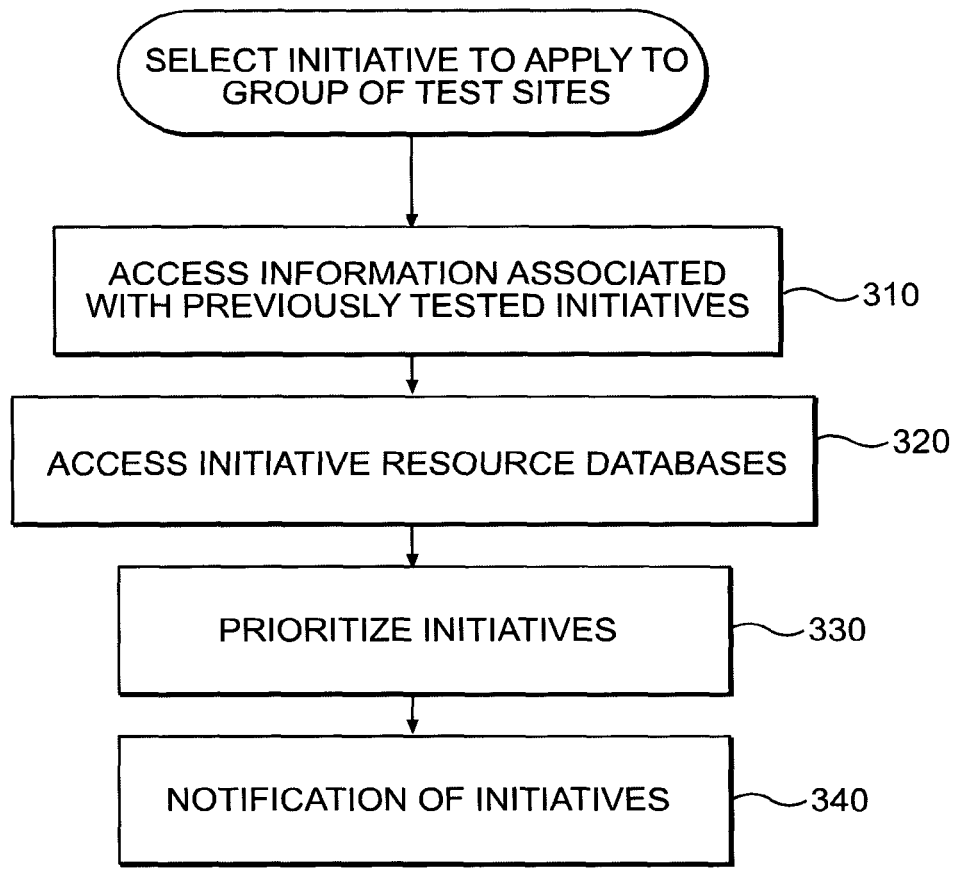
FIG. 3 illustrates a flowchart of an exemplary initiative selection process, consistent with certain aspects of the present invention.

As described above in connection with Step 210 of FIG. 2, aspects of the invention enable a user of business management unit 116 to select an initiative to apply to a number of test sites. FIG. 3 shows a flowchart of an exemplary initiative selection process, consistent with certain aspects of the present invention. In one aspect, a user may implement client 118 to access information associated with previously tested initiatives (Step 310). To do so, client 118 may access database 140, which stores historical data associated with previously developed and tested initiatives that mayor may not have been rolled out in business network 110. Alternatively, the historical data may be stored in a database that is implemented by business management unit 116 and/or one or more of business locations 114. The historical data may reflect parameters, details, performance results, test criteria, etc. associated with one or more initiatives previously tested and/or implemented by business network 110. For example, the historical data may identify test sites that executed the previous initiative, control sites associated with the test of the previous initiative, performance metrics analyzed during the test, the results of the analysis, performance models generated based on the analysis, etc. Additional details on how an initiative is analyzed and modeled are described in U.S. patent application Ser. No. 10/767,191, previously incorporated by reference.

In addition to historical data, business management unit 116 may provide access to initiative resource databases that store information associated with initiatives previously tested, currently under development for testing, and/or proposed for testing (Step 320). For instance, the user of client 118 may request and search one or more databases including information reflecting internal business memorandums, research documents, marketing documents, and any other type of document associated with initiatives developed or being developed for business network 110. Alternatively, or additionally, client 118 may have access to one or more databases including information associated with initiatives developed and/or executed by entities other than the business entity associated with business network 110. For example, the user operating client 118 may search the World Wide Web via a standard search engine for initiative concepts, research, and/or performance results.

Additionally, aspects of the invention enable client 118 to leverage server 130 to perform a process for prioritizing potential initiatives under consideration by the user of client 118 (Step 330). For instance, client 118 may request and display a user interface, such as a Web page, that queries the user to provide initiative-based input. Based on the input, server 130 and/or client 118 may perform a process that determines the expected performance of each proposed initiative (e.g., return on investment) and prioritizes the initiatives based on the determined performance. For example, the user may input the on-going operating costs of the initiative per business location 114 and the on-going operating costs of all business locations 114 in business network 110. The user may also input an estimated revenue gain from the initiative for each business location 114 for a selected time period. Further, the user may provide a measure of percentage of revenue that flows through to profit for each business location 114 (e.g., the profits, after operating costs, that are associated with an estimated revenue stream). Based on the user input, server 130 and/or client 118 executes a process that determines an estimated return-on-investment and/or net present value of a proposed initiative. The process may compare the estimated results across different proposed initiatives to prioritize the initiatives that potentially offer the highest estimated return. Client 118 may display the initiatives as a ranked list in a graphical user interface for review by the user operating client 118. Further, the process may automatically select an initiative with the highest return on investment and present the selection to the user via the graphical user interface.

IV. DESIGNING A TEST FOR AN INITIATIVE

Figure 4A:
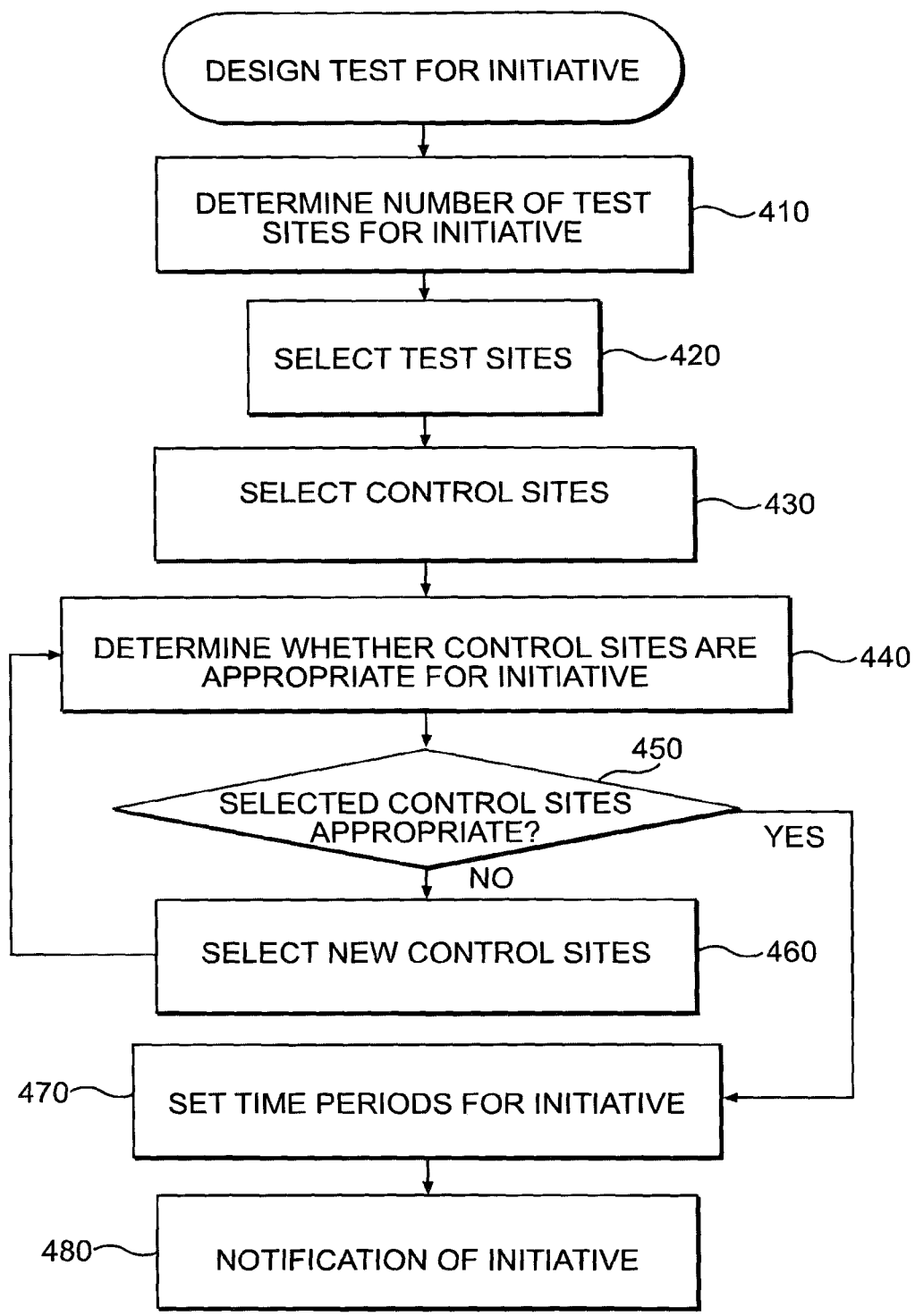
FIG. 4A illustrates a flowchart of an exemplary initiative test design process, consistent with certain aspects of the present invention.

As explained above in connection with Step 220 of FIG. 2, once an initiative is created and selected, a test for determining the efficacy of the initiative is designed. FIG. 4A shows a flowchart of an initiative test design process, consistent with certain aspects of the present invention. An issue that occurs when developing initiatives is how broadly to test the initiative in the business network 110. As such, aspects of the invention execute processes that determine the number of test sites that need to be included in an initiative test in order to achieve statistically meaningful results for analysis (Step 410). For instance, the number of test sites needed for an initiative test may be driven by the size of the change in a selected performance metric (e.g., test site v. control site change in performance metrics) and the amount of variance normally seen in that selected metric. Accordingly, aspects of the invention perform processes that provide a user of client 118 with a mechanism for inputting selected settings that are leveraged by server 130 and/or client 118 to produce an indication of statistical confidence in the expected performance of the initiative associated with a number of test sites and/or control sites selected for a given initiative.

To better illustrate the above described aspects of the invention, FIG. 4B shows a screen shot of an exemplary site selection Web page 400, consistent with certain aspects of the present invention. Client 118 may generate Web page 400 in response to a request by the user to analyze the confidence in measuring a determined change in performance at a determined number of sites for a given test. In one example, for a given proposed initiative, a user may input a type of performance metric (e.g., sales), a category being measured (e.g., entire business location, type of product, etc.), a test period, and the number of test sites and control sites proposed for the initiative test. Based on this input, client 118 and/or server 130 determines the number of test sites needed for the proposed initiative to have a particular statistical confidence in a given lift in the selected performance metric. As shown in FIG. 4B, Web page 400 may include a result component that displays numbers of test sites 402 needed to achieve a given confidence value (e.g., 406) for a given lift in performance metric 404. For example, if, hypothetically, the user, or a software process, determines that a 3% lift is the most likely result of the initiative and requires an 80% 1-p value, or confidence that the lift is meaningful, then the software may determine that at least 25 test sites are needed for an 80% confidence in the measurement of a 3% lift. It should be noted, while Web page 400 shows a results component in an array format, other forms of output may be presented to a user in accordance with aspects of the invention. For instance, client 118 may display a graphical view that only presents the number of test sites required for a selected lift in a performance metric for a given control group size. Further, based on the number of selected control sites, client 118 and/or server 130 may determine the number of test sites required to achieve certain levels of confidence for given performance metric lifts.

Figure 4C:
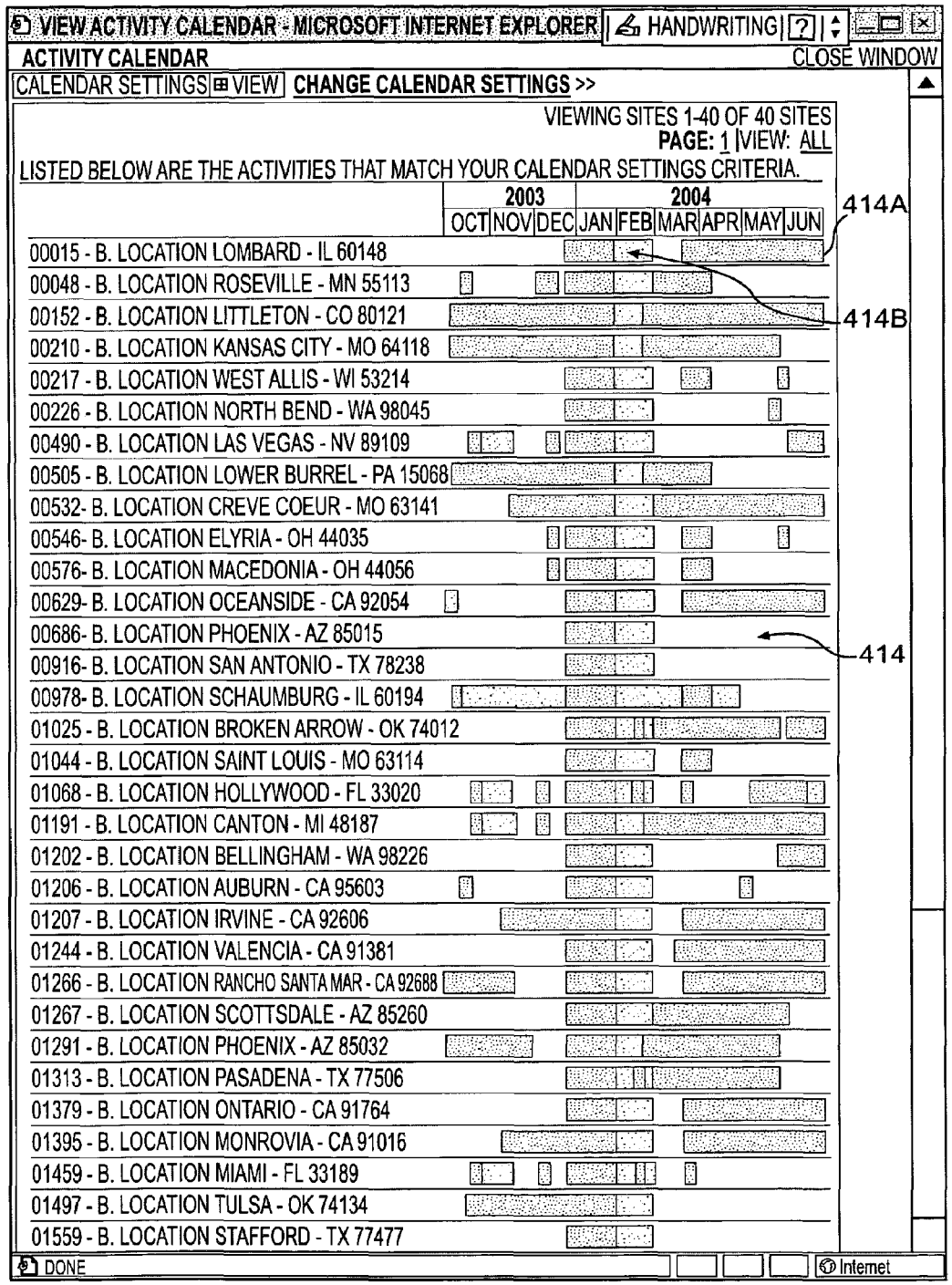
FIG. 4C shows a screen shot of an exemplary site activity calendar Web page, consistent with certain aspects of the present invention.

Once the appropriate number of test sites is determined, the user of client 118 may select the test sites to be included in the set of test sites for testing the initiative (Step 420). In one aspect, client 118 may present to the user information identifying which business locations 114 in business network 110 are executing a different initiative or is assigned as a test site for a different initiative. Client 118 may present this information as a graphical view that may be viewed and searched by the user. Client 118 may present this information in the form of a data structure that includes all other initiatives occurring at each business location 114 in network 110. The user may sort and/or filter the data structure by business location 114 or initiative. In one aspect, the data structure may be in the form of a graphical interface, such as a calendar that lists dates and initiatives corresponding to selected business locations 114. The calendar may be color coded to indicate the status of each business location 114 in relation to a given initiative (e.g., initiative test set up, executing an initiative, implementing a rolled out initiative, etc.). To illustrate this exemplary aspect of the invention, FIG. 4C shows a screen shot of an exemplary Web page 412 that includes a color coded calendar 414 listing a plurality of business locations and their respective status associated with an initiative. For example, calendar 414 may include first status information 414A presented in one color and second status information 414B presented in another color. It should be noted that aspects of the invention are not limited to the calendar format shown in FIG. 4C, as other types of graphical views may be implemented by aspects of the invention to present the status of business locations. For instance, textual information may be used to reflect the status of initiatives for each business location 114.

In another aspect of the invention, client 118 and/or server 130 may execute a process that automatically assigns business locations 114 as test sites based on data included in the data structure. For instance, data may be stored in a database, such as database 140, that corresponds to each business location's 114 role in one or more initiatives. The process executed by client 118 and/or server 130 may access the stored data to determine which business locations 114 to include in testing the selected initiative. The decision may be based on predetermined rules that consider the number of initiatives each business location 114 is currently assigned, the types of initiatives that are assigned, the parameters associated with the assigned initiatives (e.g., performance metrics measured, etc.), the attributes associated with each business location 114, and any other information that may be programmed as a rule for consideration in selecting test sites.

Once the user, or a software application executed by a processor, selects the business locations 114 to be assigned as test sites for the proposed initiative, the control sites are selected (Step 430). The user operating client 118 may view the status information associated with business locations 114 described above to select the appropriate business locations that will be assigned as control sites in a control group.

Once the control group is selected, client 118 and/or server 130 determines whether the control sites included in the control group are appropriate for the proposed initiative (Step 440). To accurately analyze test results, control sites should be selected that have performance patterns similar to the test sites during a time frame extending up to the date that the initiative is introduced at the test sites. Accordingly, in one aspect, server 130 and/or client 118 executes a process that determines how well the control group matches the test group in a selected time period leading up to a proposed start date for the initiative test. That is, for a selected performance metric (e.g., sales), the process determines how the control sites were trending relative to all of the test sites and to each individual test site.

Figure 4D:
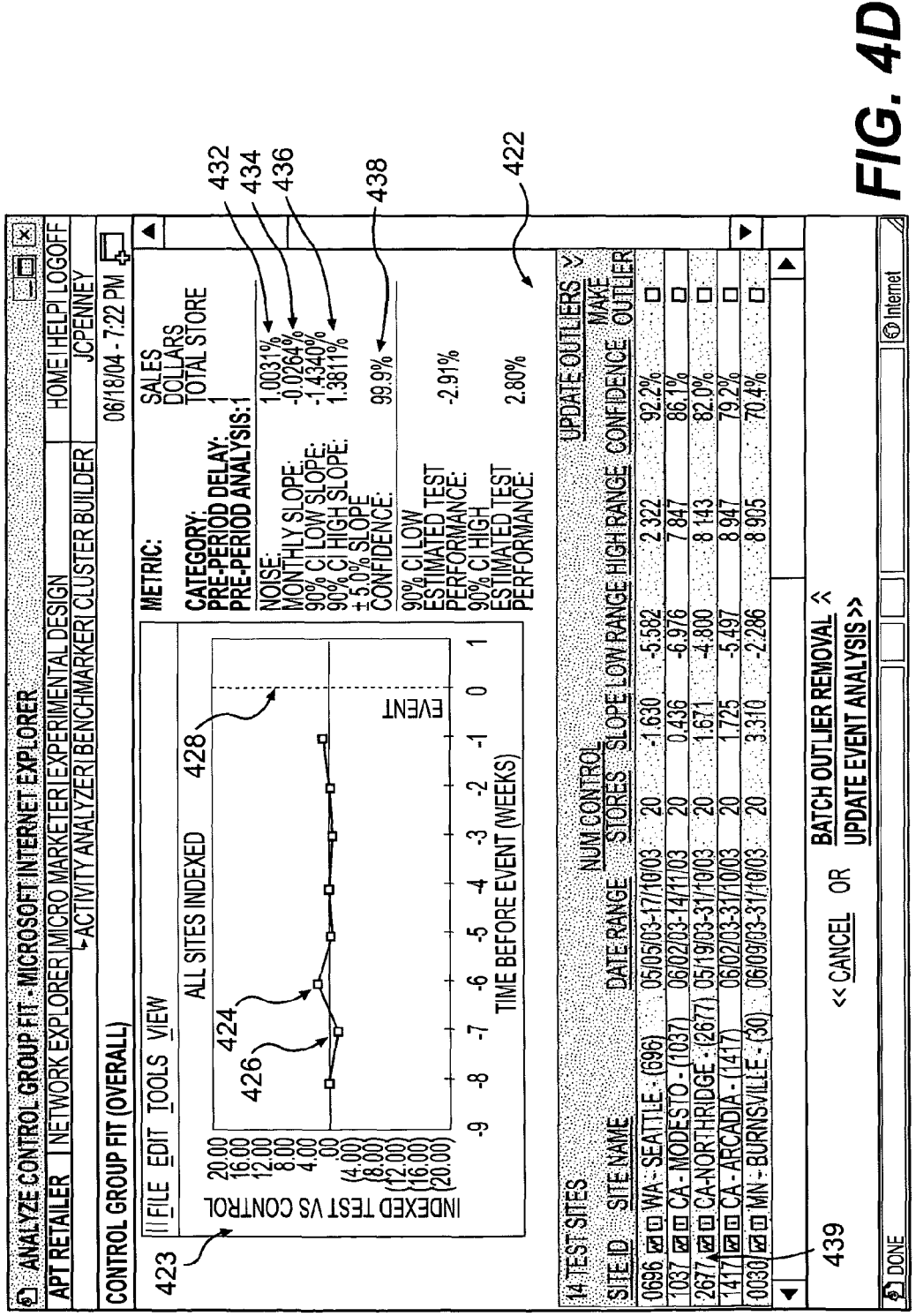
FIG. 4D shows a screen shot of an exemplary control group fit Web page, consistent with certain aspects of the present invention.

Client 118 may generate a graphical view that reflects the performance metric values of the test sites indexed to the control sites during the selected time period before the start date of the initiative. The graphical view may also present information reflecting the variability (i.e., standard deviation) of the indexed values and information indicating how test site performance metric changes over time relative to the control sites during the selected time period before the start date of the initiative. For instance, FIG. 4D shows a screen shot of an exemplary Web page 422 including a graphical view of a control group fit consistent with these aspects of the invention. As shown, Web page 422 includes a graph 423 that represents a time series view of how the selected test sites performed when indexed against the control sites' performance during the selected time period prior to the initiative execution start date, also called an "event" date 428. This is shown as function 424 in graph 423. The index between the test group and control group is represented by the y-axis centered on a O-line. Data points on function 424 that are above the O-line indicate test sites that have performance metric values above the expected performance values generated by the control group. Similarly, data points on function 424 below the O-line indicate that the performance metric values for the test sites were below those associated with the control sites. Additionally, graph 423 may include a slope function that is represented by dotted line 426. Slope 426 indicates how test site performance changes over time relative to control sites during the selected time period before event date 428. The closer the slope is to zero, the better the relation is between the test and control sites' performance metrics. Further, the space between the slope line 426 and the values of function 424 represent noise, which is a measurement of the variability of the y-values of the indexed test v. control site performance metric values.

Also, Web page 422 may also include data values reflecting the information graphically displayed in graph 423. The data values may include a value reflecting the noise 432 and slope 434 corresponding to the data in displayed in graph 423. Additionally, the data values may include confidence interval slope values 436 that reflect a range of possible slope values over a time period (e.g., one month) if a certain percentage confidence interval was associated with the measured slope. For instance, the difference between the "90% CI Low Slope" and "90% CI High Slope" values 434 reflect the range of slope values for a measured monthly slope within a confidence interval of 90%. Additionally, Web page 422 may also include a slope confidence value 438 that reflects a I-P value confidence that the measured slope value is between a designated percentage range, such as −5% and 5%. Web page 422 may also display a table 439 that lists test site information corresponding to the control group fit analysis represented in graph 423. Web page 422 is not intended to be limiting as aspects of the invention may implement other types of user interfaces to convey the control group fit assessment information to a user.

Referring back to FIG. 4A, based on the control group fit analysis (Step 440), the user, client 118, and/or server 130 determines whether the control sites selected for the control group are appropriate for the initiative executed at the test sites selected in Step 420 (Step 450). For instance, client 118 and/or server 130 may determine that the control group is appropriate for the initiative if the relationship between the performance of the control sites and the performance of the test sites during the pre-execution time period is within a predetermined threshold value. For example, if slope range of values 436 is within a predetermined value, the control sites may be deemed appropriate. Additionally, or alternatively, the control sites may be determined to be appropriate if the noise 432 is below a predetermined value. Alternatively, or additionally, client 118 may receive input from a user reflecting a decision whether the control sites are appropriate for the initiative based on a review of Web page 422 or a similar user interface reflecting the results of the analysis by client 118 and/or server 130.

If the control sites are not determined to be appropriate, (Step 450; NO), client 118 may allow the user or a software process to select a new control group of control sites (Step 460), and the process returns to Step 440 to determine whether the new control sites are appropriate. If, however, the control sites are appropriate (Step 450; YES), the user may select the time period for the initiative test (Step 470) and the process ends. Time periods may be set individually for each test site. That is, a test period for the initiative may be the same for each test site, or each individual test site may begin execution of the test at different times. For instance, a first test site may begin executing an initiative having a test period of five months on January 15th, while a second test site begins the same initiative on February 15$^{th}$. Thus, the first test site will complete the initiative on June 15th and the second test site will complete the same initiative on July 15$^{th}$.

In another aspect of the invention, client 118 and/or server 130 may execute a process that automatically selects a control group based on matching performance patterns in the period before the execution date of the initiative. For example, once the test sites have been selected, the executed process may perform processes similar to those described above in connection with Steps 440 and 450. The executed process, however, may automatically identify and select the set of control stores that are the best match for each individual test store. For example, the process could select the set of control stores whose performance patterns most closely mirror each test site in the period leading up to the start of the initiative. Once appropriate control sites are identified, the executed process may assign these sites in the control group used for analyzing the initiative.

In addition, aspects of the invention allow client 118 and/or server 130 to notify users of computer systems operating in business locations 114 of proposed initiatives being developed and/or selected by the user of client 118 and/or a software process executing at client 118 (Step 480). For example, server 130 may generate email messages that include data reflecting a proposed initiative generated by a user of client 118. The email messages may be directed to one or more users (e.g., managers, marketing personnel, etc.) of business locations 114. Additionally, initiatives developed by a user associated with one of business locations 114 may be identified in an email message that is sent to other users of other business locations 114, client 118, and/or server 130. Alternatively, or additionally, a central database may be maintained by server 130 and/or business management unit 116 that includes data reflecting initiatives developed or under development by users associated with business locations 114. When a new initiative is added to the central database, server 130 and/or client 118 may send a notification to selected users of business locations 114 reflecting the addition of the new initiative. The user may access the central database to review the updated information. Accordingly, information associated with developed initiatives, or initiatives under development, is shared across some or all users associated with business locations 114 and/or client 118 to assist in creating and selecting an initiative to apply to a group of test sites.

V. EXECUTING THE DESIGNED INITIATIVE

Figure 5A:
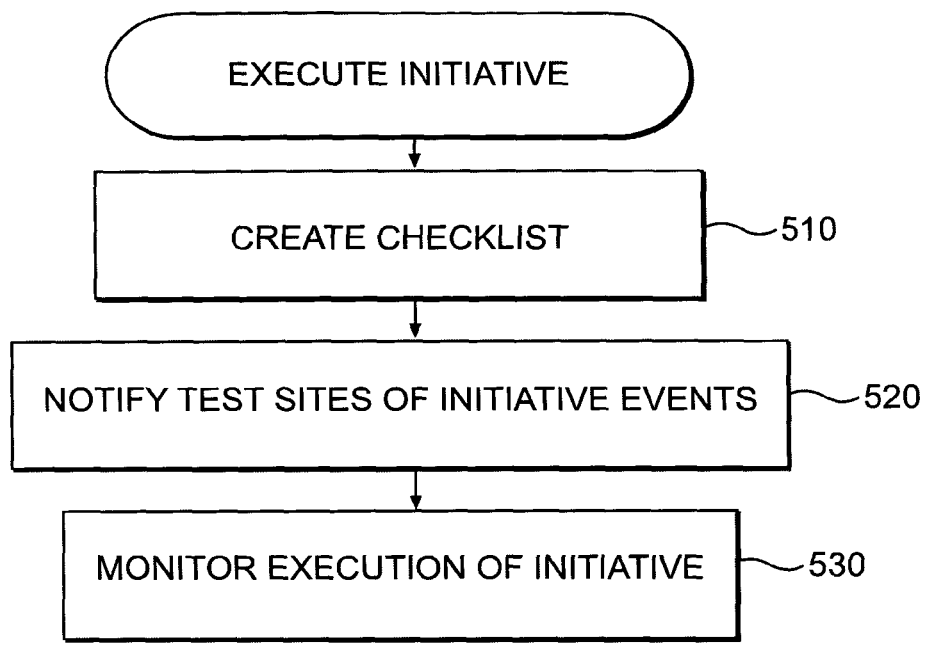
FIG. 5A illustrates a flowchart of an exemplary initiative execution process, consistent with certain aspects of the present invention.
Figure 5B:
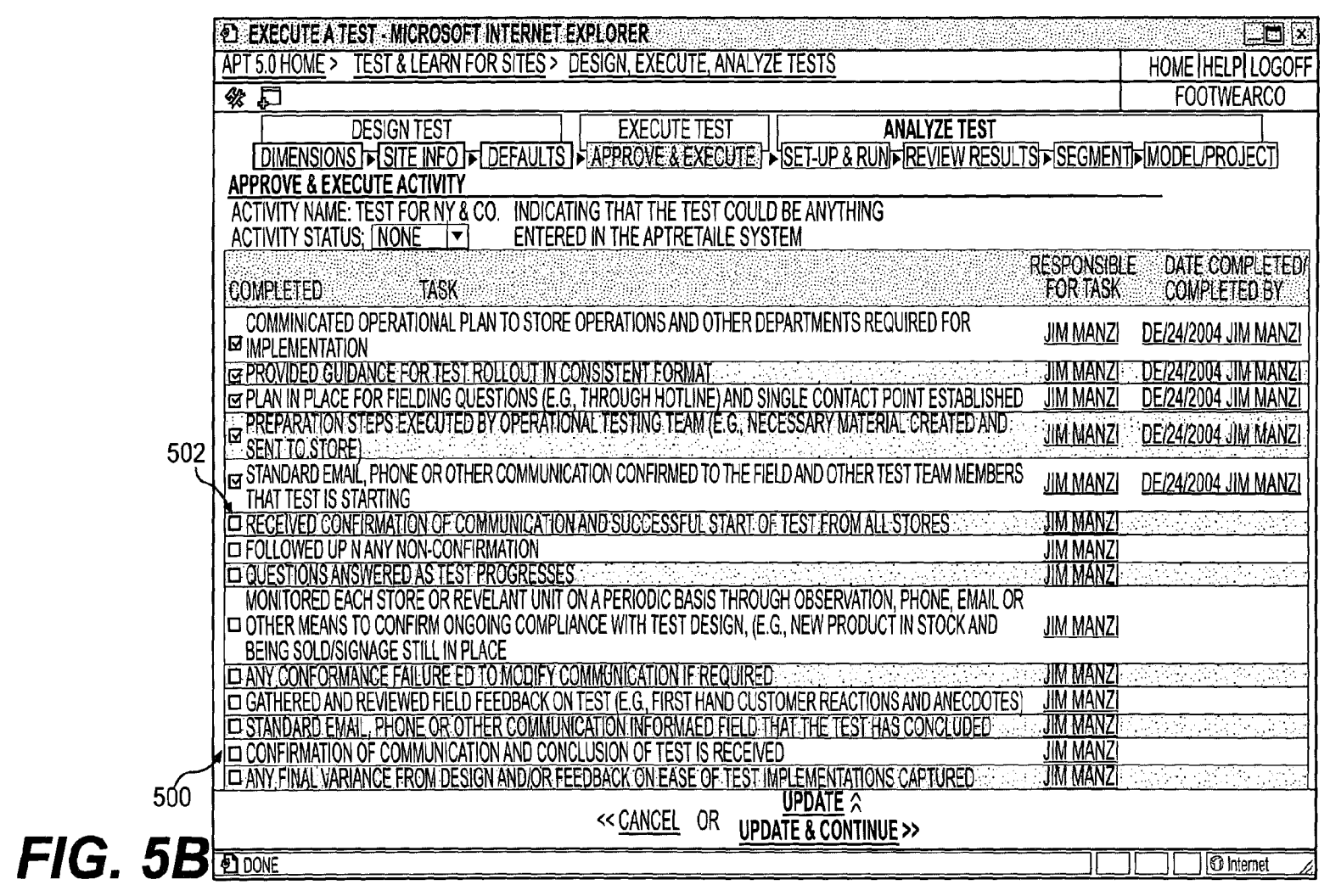

As described above in connection with Step 230 of FIG. 2, after the initiative is selected and designed, it is executed. FIG. 5A shows a flowchart of an exemplary initiative execution process, consistent with certain aspects related to the present invention. Execution of the initiative may include performing the necessary tasks associated with the initiative at each of the business locations 114 designated as test sites. To manage the execution, client 118 and/or server 130 may generate and provide a checklist for the initiative to a user associated with each business location 114 (Step 510). In one aspect, the checklist may include a plurality of tasks that need to be performed in order to execute the initiative. To manage this across the test sites, client 118 may request feedback from the test sites associated with the tasks listed in the checklist. Thus, as a task is performed, a user or software process associated with a test site may provide feedback to client 118. For instance, FIG. 5B shows a screen shot of an exemplary Web page 500 that includes a checklist of tasks 502 for an exemplary initiative. As shown, checklist 502 associates each task with a person responsible for performing or overseeing the task, and an indication when the task was completed. In accordance with certain aspects, a user associated with a test site may update information associated with the progress of the completed tasks for an initiative using Web page 500, or a similar form of user interface. The test site user may leverage a computer system to send the updated information to client 118, or alternatively, client 118 may independently access the updated information via a central database that stores the information once received by the test sites.

In addition to a checklist, client 118 may provide to users associated with the test sites notifications corresponding to one or more events associated with an initiative (Step 520). For example, client 118 may execute a process (via server 130 or independent of server 130) that generates email messages that are automatically sent to the users associated with the test sites (e.g., a manager of a store). The email message may indicate an upcoming initiative start date. Further, the users associated with the test sites may send email messages to a user associated with business management unit 116 indicating that the initiative has started or ended at their respective test site and/or that that particular tasks have been completed according to the given initiative. For instance, a manager associated with business management unit 116 may send an email message to a test site manager to determine whether a new product display was set up on an expected date in a designated location according to a particular initiative. Also, by leveraging the shared data structure aspects of the present invention, a user associated with a test site may notify business management unit 116 that the execution of an initiative under test may be delayed for some reason. In this manner, business management unit 116 is kept current on the actual start dates of the initiatives for each test site, thus allowing analysis of the results of the initiatives to be adjusted accordingly.

Based on the information provided by the users associated with the test sites, client 118 and/or server 130 may monitor execution of the initiative (Step 530). Monitoring may include determining whether test sites are complying with scheduled events associated with an initiative. Based on the determination, client 118 and/or server 130 may update a report that monitors the progress of an initiative on an individual test site basis or on an overall test site basis. The report may be provided to selected users of business management unit 116 and/or users of the test sites for the initiative. In this manner, the initiative is coordinated between the test sites and a central location (e.g., business management unit 116).

During, or following the completion of an initiative, each test site may provide test site initiative result data reflecting information associated with one or more performance metrics associated with the initiative under test. Client 118 may collect the test site initiative result data and store this information for subsequent analysis. Further, because financial result data may be continuously and automatically transferred from all sites to client 118, aspects of the invention enable client 118 and/or server 130 to collect result data associated with any initiatives being performed by business network 110.

VI. ANALYZE TEST RESULTS OF AN INITIATIVE

Test site initiative result data is analyzed to determine an appropriate model that generates estimated performance metric data that is accurate in relation to the control sites selected for the initiative. To analyze the result data, client 118 may download information to server 130 associated with the results of the test initiatives at the test sites. Also, result data is collected from control sites. Further, server 130 may receive, or retrieve, attributes associated with each business location 114 from client 118, such as store size, locations, sale data, types of products and/or service offered, location and distances of competing merchant sites, age of the business location, amount of a lease (if any), weather during the test period, staff information, etc. Alternatively, or in addition to the information provided by client 118, server 130 may execute software that determines, collects, and/or retrieves attribute information associated with business network 110, regions 112-1 to 112-N (e.g., population and demographic data, etc.), and business locations 114. The attribute information may be stored in database 140 for subsequent use by server 130 and/or client 118. Server 130 implements segmentation engine 137 to perform a segmentation process that segments test site result data against predefined attributes, such as business location size or demographics, to identify business location environments where the initiative work best.

VII. CREATE AND IMPLEMENT INITIATIVE ROLLOUT PLAN

Once the user and/or server 130 has analyzed the segmented results, a user and/or server 130 can select and execute an appropriate model to be used for analyzing the initiative performed in the test sites and predicting the impact of the initiative if extended to non-test sites. For example, server 130 may be configured to execute the selected model using information related to the test sites to identify the attributes that are deemed most relevant to the success of certain test sites that implemented the initiative. Server 130 uses the test site information to train the selected model. The user and/or server may analyze the results of the executed model to determine that the model is predicting accurate performance metric data based on the actual initiative feedback data provided by the test sites. Then, server 130 may apply the model to the non-test sites in order to predict how the performance of those sites would change if the initiative was extended to them.

Selecting and executing a model may be performed in a manner similar to that described in connection with FIGS. 3A and 3B of U.S. application Ser. No. 10/767,191. For example, server 130 may offer different types of modeling methodologies that are used to predict performance values of the test and/or control group sites, such as linear regression, staged linear regression, neural network basic train, neural network stepwise regression, decision tree, K-means similar site modeling, and any other type of software model that may be used to analyze the information produced server 130 during the initiative analysis process. Once a model is selected, server 130 may query the user for parameters and other type of information used by the selected model. For example, the user may select the type of performance metric to run in the selected model. Further, server 130 may allow the user to select which attributes are available for consideration by the selected model when executed. The user may identify attributes for consideration via a user interface, such as Web page 1300 illustrated and described in connection with FIG. 13 of U.S. application Ser. No. 10/767,191.

Additionally, analyzing the results of the executed model may be performed in a manner similar to that described in connection with FIG. 3B of U.S. application Ser. No. 10/767, 191. For example, once the model is executed, server 130 may generate and render the results to the user, via client 118. In one aspect, server 130 may generate a model results web page that includes information pertaining to the results of the executed model. The model results web page may include details of the attributes selected by the model. Additionally, the model results page provide information showing the average impact of each attribute on the model results. Moreover, server 130 may provide information showing how accurate the model predicts performance values of the test sites based on the selected parameters (e.g., attributes) and the initiative. In one aspect, server 130 may provide quantitative measures reflecting the fitness of the model for predicting and analyzing the performance values of the test sites. Additionally, server 130 may provide confidence measurements reflecting quantitative values of how well each attribute is actually contributing to producing a model that will successfully predict the performance metrics of the non-test sites when implementing the initiative.

The user of business management unit 116 uses the model result information to determine whether the selected model and/or attributes are acceptable. Alternatively, a software program executed by client 118 and/or server 130 may analyze the information produced by the executed model to determine whether the model and/or attributes considered by the model are acceptable based on predetermined rules. If the results are not acceptable the user and/or software program may re-select a model, attributes, and/or parameters for analyzing the initiative. For example, the user may remove one or more attributes from consideration prior to re-execution of the selected model. If, however, the results are acceptable, the user and/or software program may direct server 130 to apply the model to a selected number of business locations 114 (e.g., non-test group sites) to determine a predicted impact of the initiative on these sites. The server 130 may do this by applying attributes and their corresponding coefficients selected by the model to each non-test site's values for those attributes. In doing so, server 130 calculates the predicted performance of the initiative on each non-test site based on that site's relevant attributes.

In another aspect of the invention, a user may utilize the segmented analysis results and models generated by server 130 to evaluate several tested initiatives simultaneously and select which initiative to implement in a rollout to each business location 114. For example, as described in U.S. patent application Ser. No. 10/767,191, models may be built that estimate the impact of an initiative if it was applied to selected business locations 114 in business network 110. In accordance with certain aspects of the invention, a user may analyze comparable initiatives, and based on the analysis, designate the initiative that is more profitable for rollout.

Figure 6:
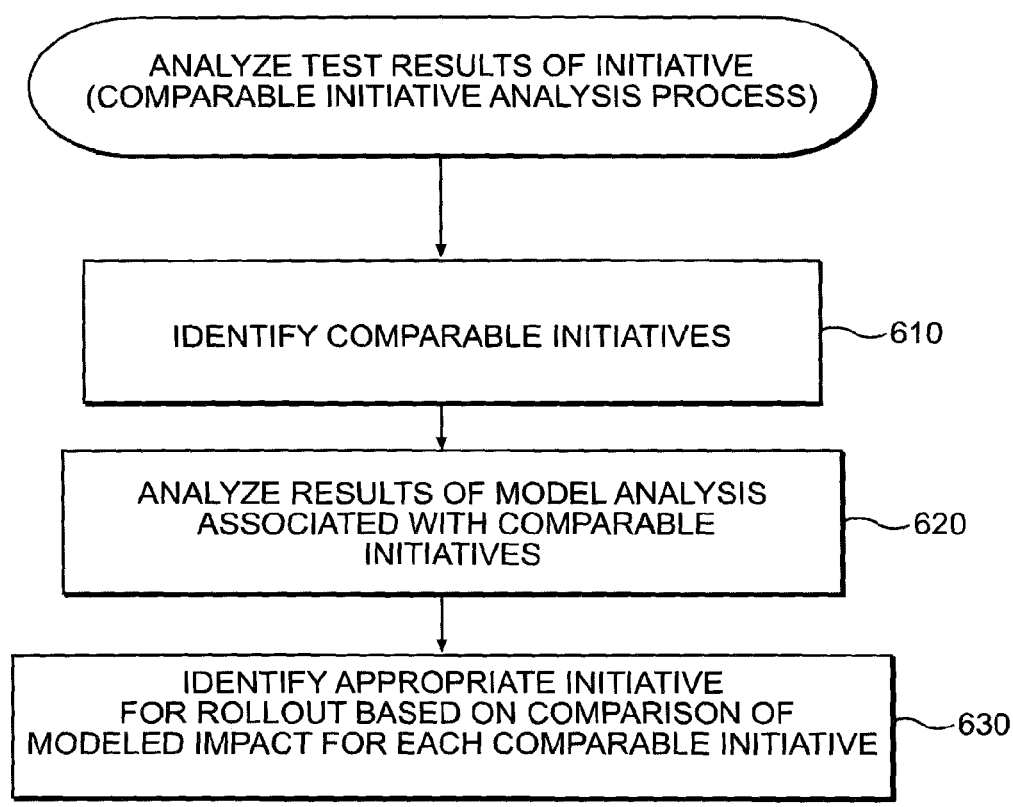
FIG. 6 illustrates a flowchart of an exemplary comparable initiative analysis process, consistent with certain aspects of the present invention.

FIG. 6 shows a flowchart of an exemplary comparable initiative analysis process consistent with these aspects of the present invention. As shown, a user may direct client 118 and/or server 130 to execute a process that identifies comparable initiatives (Step 610). Initiatives are comparable when they include ideas or tasks that are similar or are associated with similar products or tasks. For example, initiatives may be comparable if they involve displaying the same product in different locations of a business location 114. Alternatively, the initiatives may be comparable if they involve displaying different products in the same location of a business location. Thus, in the previous examples, either the product was the same, or the task was the same (i.e., displaying a product in a given location). Other characteristics associated with initiatives may be used to determine whether they are comparable and the above examples are not intended to be limiting. Further, it should be noted that there may be any number of comparable initiatives identified, such as two, three, or more initiatives.

As such, in one aspect of the invention, client 118 and/or server 130 may execute a process that analyzes information stored in the central database associated with previously executed initiatives. The executed process may compare parameters associated with the previously executed initiatives to identify similar facets of different initiatives, such as similar performance metrics, attributes, performance results, category information etc. Based on the analysis, client 118 and/or server 130 may identify the comparable initiatives. In another aspect, client 118 and/or server 130 may generate a user interface including a list of comparable initiatives from which a user may select for analysis. Alternatively, the user may leverage client 118 and/or server 130 to access the central database that stores information associated with previously executed initiatives in order to identify comparable initiatives. As such, a user operating client 118 may designate which initiates are comparable and are to be included in the analysis process by providing input to client 118.

Once comparable initiatives are identified, client 118 and/or server 130 may analyze the results of executed models associated with each of the comparable initiatives (Step 620). The comparison may be based on a selected performance metric that was monitored and modeled in each of the comparable initiatives, such as sales. Based on the comparison, client 118 and/or server 130 may identify the initiative that has the best estimated impact in relation to the performance metric for each site and designate the identified initiative for rollout to that site (Step 630). Based on the identification, client 118 may display results reflecting the relationship between the comparable initiatives for each site. A user operating client 118 may view the results to determine which initiative to implement to rollout to each site. Alternatively, client 118 and/or server 130 may execute a process that analyzes the results to identify the more profitable comparable initiative(s) for each site based on their estimated performance metric results. Thus, aspects of the invention enable a user or a software process executed by server 130 and/or client 118 to assign the most profitable initiative to selected business locations 114 in business network 110 based on the estimated performance values generated by the executed models for each of the comparable initiatives.

As described above in connection with Steps 250 and 260 of FIG. 2, once an initiative has been tested, analyzed, and modeled, it may be selected for rollout. Thus, a rollout plan is created. In one aspect, an initiative may be selected for rollout based on the performance results associated with the test sites included in the initiative. Further, the actual business locations that should be included in the rollout may also be identified. Thus, once server 130 applies a tested model to the non-test group sites and the test sites, and a determination may be made as to those sites having the highest or more acceptable predicted performance metric values. Server 130 may rank the sites accordingly and provide this information to the user via client 118. For instance. server 130 may identify those sites that have an estimated larger sales lift when implementing the initiative than those who have lower estimated sale values. The user may select one or more of business locations 114 to implement the initiative. Accordingly, the user, or a software process executed by server 130 and/or client 118, analyzes the information provided by model processing engine 138 and server 130 to make an informed decision on which sites to implement the initiative tested at the test sites. Along the same lines, the user may also select those sites that should not implement the proposed initiative.

Additionally, consistent with certain aspects of the invention, methods and systems of the present invention leverage the shared data aspects of the present invention to enable a user and/or a software process to properly, create, schedule, and manage implementation of the rollout. In one aspect, the calendar graphical representations made available by client 118 to business locations 114 may be used to schedule a rollout. For instance, users of business locations 114 may access and view a data structure, such as a calendar showing all business locations 114 that are assigned an initiative and/or are currently executing an initiative. Reviewing the data structure, a user of a business location 114 may determine that a planned rollout of a particular initiative will disrupt the performance of another initiative or the performance metric of the business location. As such, the user may use the data structure or other notification mechanisms, such as those described above in Section V, to notify a manager of business management unit 116 that the rollout of an initiative will be delayed. The manager that operates client 118 may use this information to update the data structure to reflect the new rollout date for the initiative by the affected business location. Alternatively, client and/or server 130 may execute a process that automatically updates the data structure to reflect the new rollout date.

Based on the information provided by users associated with business locations 114, a user associated with business management unit 116 may adjust a rollout of an initiative for some or all business locations 114 in business network 110. Alternatively, client 118 and/or server 130 may execute a process that automatically adjusts the rollout date of the initiative based on the information received from business locations 114. Thus, aspects of the invention implement business management unit 116 and/or server 130 as a central location that shares data associated with the status and progress of initiatives among business locations 114 and business management unit 116 that enables a user (e.g., a manager) of a business location 114 or business network 110 to manage the execution of initiatives that have been selected for rollout.

IV. CONCLUSION

Variations of the methods and systems consistent with features of the present invention previously described may be implemented without departing from the scope of the invention. For example, server 130 may be configured with software that automatically performs some or all of the analysis and decisions performed by a user operating client 118. The processes described herein are not intended to be limiting and other procedures may be performed by software processes executed by server 130 and/or client 118 to supplement and/or compliment those decisions, data input, and analysis performed by a user.

Also, although the processes associated with certain aspects of the present invention are described in connection with web server and browser software for exchanging information between business locations 114, client 118 and/or server 130, methods and systems consistent with aspects of the invention may use any type of technology to allow a user to send and receive information between the components of FIG. 1. Further, although the above described aspects of the invention include communications between a client 118 and a server 130, methods and systems consistent with aspects of the invention are not limited to client-server network configurations. That is, a user associated with business network 110 may leverage a computing environment that is local (i.e., same computing system) to a system operated by the user.

Further, methods, systems, and articles of manufacture, consistent with features of the present invention may be implemented using various network models, and is not limited to a particular computer and/or network environment. Furthermore, methods, systems, and articles of manufacture, consistent with features of the present invention are not limited to the implementation of systems and processes compliant any particular type of programming language. Any number of programming languages may be utilized without departing from the scope of the present invention.

Additionally, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described aspects of the invention, but instead is defined by the appended claims in light of their full scope of equivalents.

What is claimed is:

1. A computer-implemented method for developing and managing a business initiative that changes an aspect of operation of a business in a business network, the method comprising:

developing, by a computer, a test of the business initiative to occur in selected test locations;

comparing, by the computer, historical performance metric values of the test locations indexed to historical performance metric values of a plurality of control locations that have not received the business initiative over a time period before the business initiative occurs in the test locations; and automatically selecting control locations for the test location implementing the business initiative by:

determining, by the computer, a measure of a deviation between the plurality of control locations indexed against each individual test location based on a comparison of the historical performance metric values over the time period to assess how each control location trends relative to each test location;

determining, by the computer, a value for a slope of a line on a graph showing a change in the historical performance metric values of the test location relative to the plurality of control locations during the time period, wherein the relationship between the test location and the plurality of control locations is better as the slope approaches zero; and automatically selecting, by the computer, control locations for each individual test location based on the determination of the measure of the deviation between the historical performance metric values of the plurality of control locations indexed against each individual test location and based on the determination of the value for the slope of the change in the historical performance metric values of the test location relative to the plurality of control locations.

2. A computer-implemented method for developing and managing a business initiative that changes an aspect of operation of a business in a business network, the method comprising:

developing, by a computer, a test of the business initiative to occur in selected test locations;

comparing, by the computer, historical performance metric values of the test locations indexed to historical performance metric values of a plurality of control locations that have not received the business initiative over a time period before the business initiative occurs in the test locations; and automatically selecting control locations for the test location implementing the business initiative by:

determining, by the computer, a measure of a deviation between the plurality of control locations indexed against each individual test location based on a comparison of the historical performance metric values over the time period to assess how each control location trends relative to each test location; and automatically selecting, by the computer, control locations for each individual test location based on the determination of the measure of the deviation between the historical performance metric values of the plurality of control locations indexed against each individual test location.

3. A computer-implemented method for developing and managing a business initiative that changes an aspect of operation of a business in a business network, the method comprising:

developing, by a computer, a test of the business initiative to occur in selected test locations;

comparing, by the computer, historical performance metric values of the test locations indexed to historical performance metric values of to a plurality of control locations that have not received the business initiative over a time period before the business initiative occurs in the test locations; and automatically selecting control locations for the test location implementing the business initiative by:

determining, by the computer, a value for a slope of a line on a graph showing a change in the historical performance metric values of the test location relative to the plurality of control locations during the time period, wherein the relationship between the test location and the plurality of control locations is better as the slope approaches zero; and automatically selecting, by the computer, control locations for each individual test location based on the determination of the value for the slope of the change in the historical performance metric values of the test location relative to the plurality of control locations.

\* \* \* \* \*